(12) United States Patent
Rosenberg

(10) Patent No.: US 10,822,118 B2
(45) Date of Patent: *Nov. 3, 2020

(54) TRAM SYSTEM AND METHODS FOR AUTONOMOUS TAKEOFF AND LANDING OF AIRCRAFT

(71) Applicant: Ilya Daniel Rosenberg, Mountain View, CA (US)

(72) Inventor: Ilya Daniel Rosenberg, Mountain View, CA (US)

(*) Notice: Subject to any disclaimer, the term of this patent is extended or adjusted under 35 U.S.C. 154(b) by 183 days.

This patent is subject to a terminal disclaimer.

(21) Appl. No.: 16/028,353

(22) Filed: Jul. 5, 2018

(65) Prior Publication Data

US 2019/0077520 A1    Mar. 14, 2019

Related U.S. Application Data

(63) Continuation of application No. 15/705,248, filed on Sep. 14, 2017, now Pat. No. 10,040,576.

(51) Int. Cl.

| | | |
|---|---|---|
| *B64C 25/08* | (2006.01) | |
| *B64F 1/22* | (2006.01) | |
| *B64D 45/08* | (2006.01) | |
| *B64F 1/02* | (2006.01) | |
| *B64F 1/10* | (2006.01) | |

(Continued)

(52) U.S. Cl.
CPC .............. *B64F 1/228* (2013.01); *B64C 25/08* (2013.01); *B64D 45/08* (2013.01); *B64D 47/02* (2013.01); *B64F 1/02* (2013.01); *B64F 1/10* (2013.01); *B64D 2205/00* (2013.01); *G08G 5/065* (2013.01); *Y02T 50/44* (2013.01)

(58) Field of Classification Search
CPC .... B64F 1/04; B64F 1/22; B64F 1/227; B64F 1/10; B64C 2201/208; B64C 2201/18; B64D 3/00; B60P 1/02
See application file for complete search history.

(56) References Cited

U.S. PATENT DOCUMENTS

| | | | | |
|---|---|---|---|---|
| 4,653,706 A | * | 3/1987 | Ragiab | B64F 1/10 114/262 |
| 5,150,860 A | * | 9/1992 | Young | B64F 1/10 244/50 |

(Continued)

*Primary Examiner* — Brian M O'Hara
*Assistant Examiner* — Keith L Dixon
(74) *Attorney, Agent, or Firm* — Run8 Patent Group, LLC; Peter Miller

(57) ABSTRACT

One variation of a tram system includes: a chassis; a latch configured to selectively engage a latch receiver mounted to an aircraft; an alignment feature adjacent the latch and configured to engage an alignment receiver mounted to the aircraft and to communicate acceleration and braking forces from the chassis into the aircraft; an optical sensor facing upwardly from the chassis; a drivetrain configured to accelerate and decelerate the chassis along a runway; and a controller configured to detect an optical fiducial arranged on the aircraft in optical images recorded by the optical sensor adjust a speed of the drivetrain to longitudinally align the alignment feature with the alignment receiver based on positions of the optical fiducial detected in the optical images, trigger the latch to engage the latch receiver once the aircraft has descended onto the chassis, and trigger the drivetrain to actively decelerate the chassis during a landing routine.

20 Claims, 4 Drawing Sheets

(51) Int. Cl.
*B64D 47/02* (2006.01)
*G08G 5/06* (2006.01)

(56) References Cited

U.S. PATENT DOCUMENTS

| | | | | |
|---|---|---|---|---|
| 6,394,391 B1* | 5/2002 | Lo | ............................. | B64F 1/10 |
| | | | | 244/110 A |
| 7,568,658 B2* | 8/2009 | Li | ............................. | B64F 1/10 |
| | | | | 244/110 E |
| 8,464,981 B2* | 6/2013 | Goldie | .................. | B64C 39/024 |
| | | | | 244/110 C |
| 9,139,309 B1* | 9/2015 | Al-Heraibi | ................. | B64F 1/10 |
| 10,040,576 B1* | 8/2018 | Rosenberg | ............. | B64D 47/02 |
| 2012/0158221 A1* | 6/2012 | Al Fadhli | .................. | B64F 1/02 |
| | | | | 701/16 |
| 2014/0252162 A1* | 9/2014 | Teller | ........................ | B64F 1/10 |
| | | | | 244/63 |

* cited by examiner

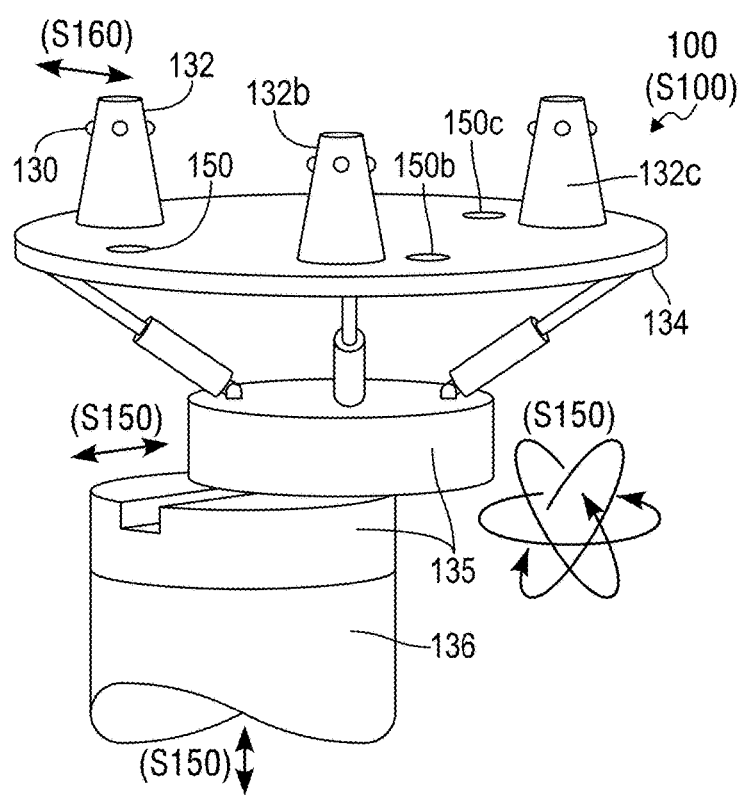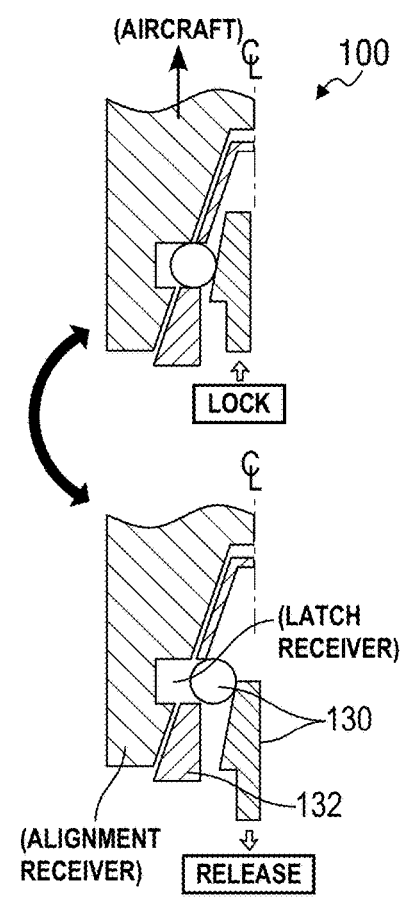
FIG. 2A
FIG. 2B
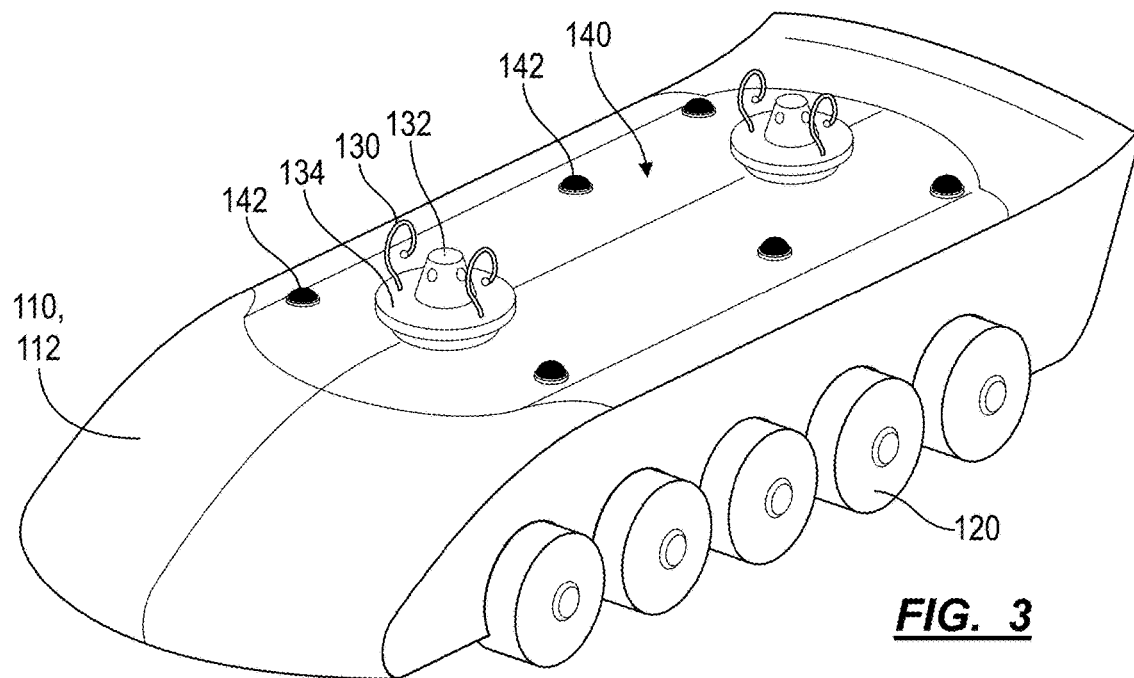
FIG. 3

TRAM SYSTEM AND METHODS FOR AUTONOMOUS TAKEOFF AND LANDING OF AIRCRAFT

CROSS-REFERENCE TO RELATED APPLICATIONS

This Application is a continuation application of U.S. patent application Ser. No. 15/705,248, filed on 14 Sep. 2017, which is incorporated in its entirety by this reference.

TECHNICAL FIELD

This invention relates generally to the field of aerospace and more specifically to a new and useful tram system and methods for autonomous takeoff and landing of aircraft in the field of aerospace.

BRIEF DESCRIPTION OF THE FIGURES

FIGS. 2A and 2B are schematic representations of one variation of the tram system;

FIG. 3 is a schematic representation of one variation of the tram system;

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Tram System

Figure 1A:
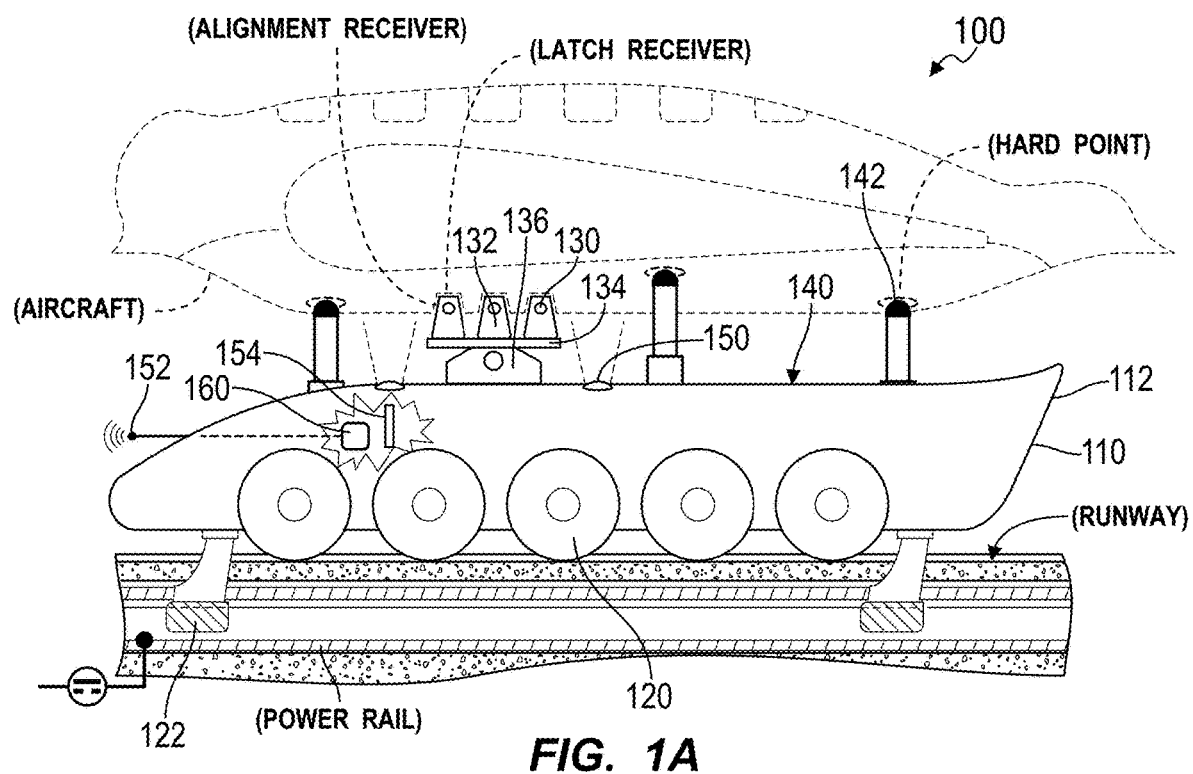
FIGS. 1A and 1B are schematic representations of a tram system.
Figure 1B:
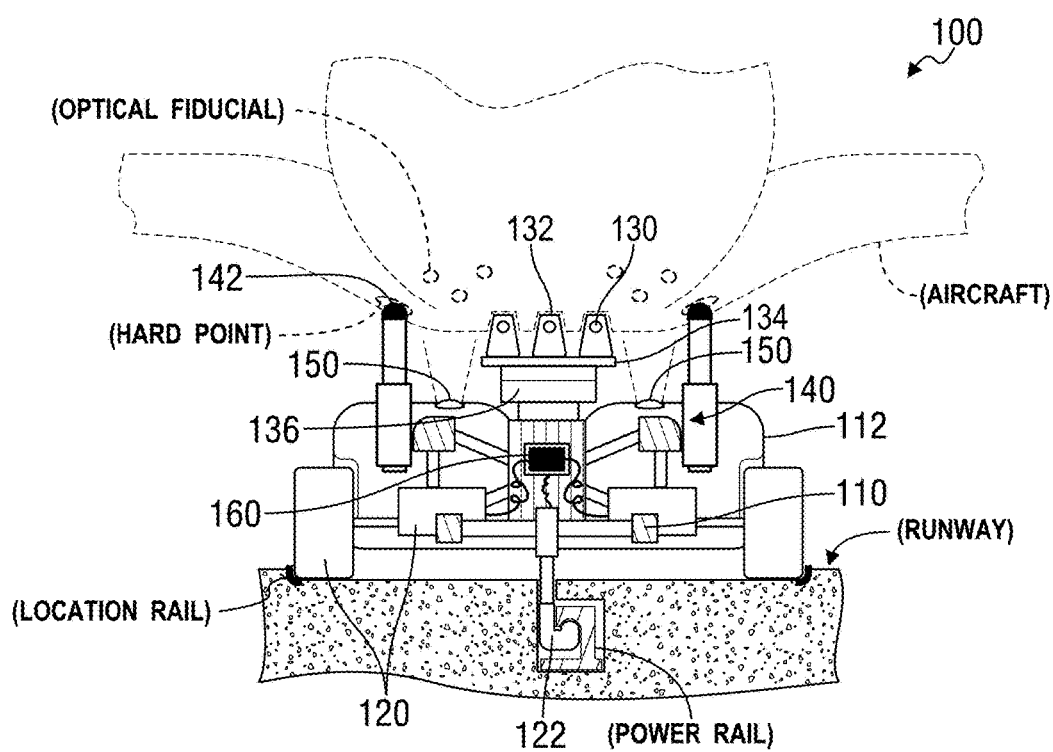

As shown in FIGS. 1A and 1B, a tram system 100 (hereinafter a "tram 1000") includes: a chassis 110; a latch 130; an alignment feature 132; a first optical sensor 150; a drivetrain 120; and a controller 160. The latch 130 is coupled to the chassis 100 and is configured to selectively engage a latch receiver mounted to an underside of a fuselage of an aircraft. The alignment feature 132 is: adjacent the latch 130; configured to selectively engage an alignment receiver mounted to the underside of the fuselage of the aircraft; and configured to communicate forces parallel to an anteroposterior axis of the chassis 100 into the aircraft. The first optical sensor 150 faces upwardly from the chassis 100 and is configured to record a first sequence of optical images. The drivetrain 120 is configured to accelerate and decelerate the chassis 100 along a runway. The controller 160 is configured, during a landing routine, to: detect a first optical fiducial arranged on the aircraft in the first sequence of optical images recorded by the first optical sensor 150; adjust a speed of the drivetrain 120 to longitudinally align the first alignment feature 132 with the first alignment receiver on the aircraft during descent of the aircraft toward the runway based on positions of the first optical fiducial detected in the first sequence of optical images; trigger the latch 130 to engage the latch receiver on the aircraft in response to descent of the first alignment receiver onto the first alignment feature 132; and trigger the drivetrain 120 to actively decelerate the chassis 100 and the aircraft in response to engagement of the latch 130 on the latch receiver.

2. Applications

Figure 4:
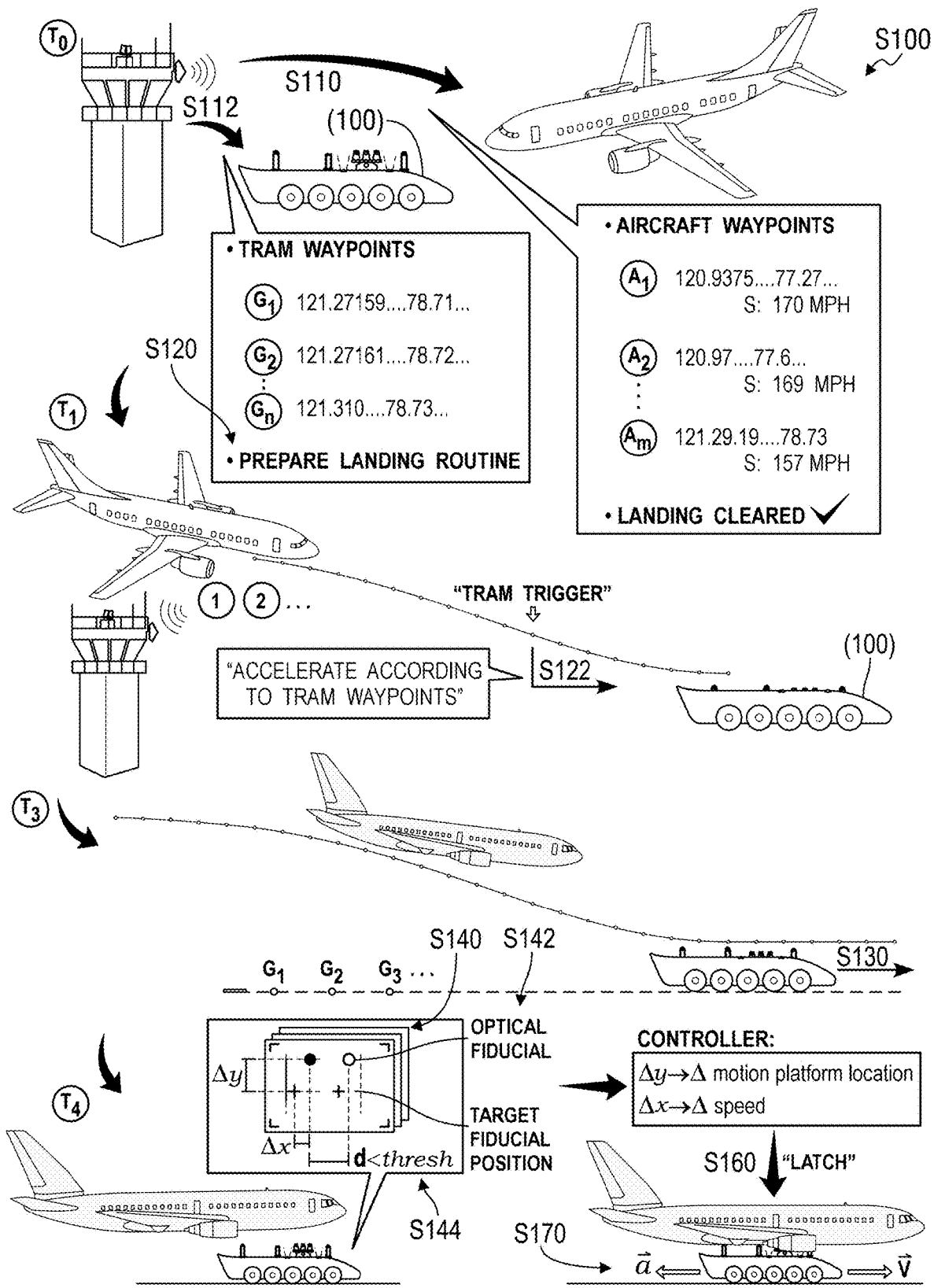
FIG. 4 is a flowchart representation of a method.
Figure 5:
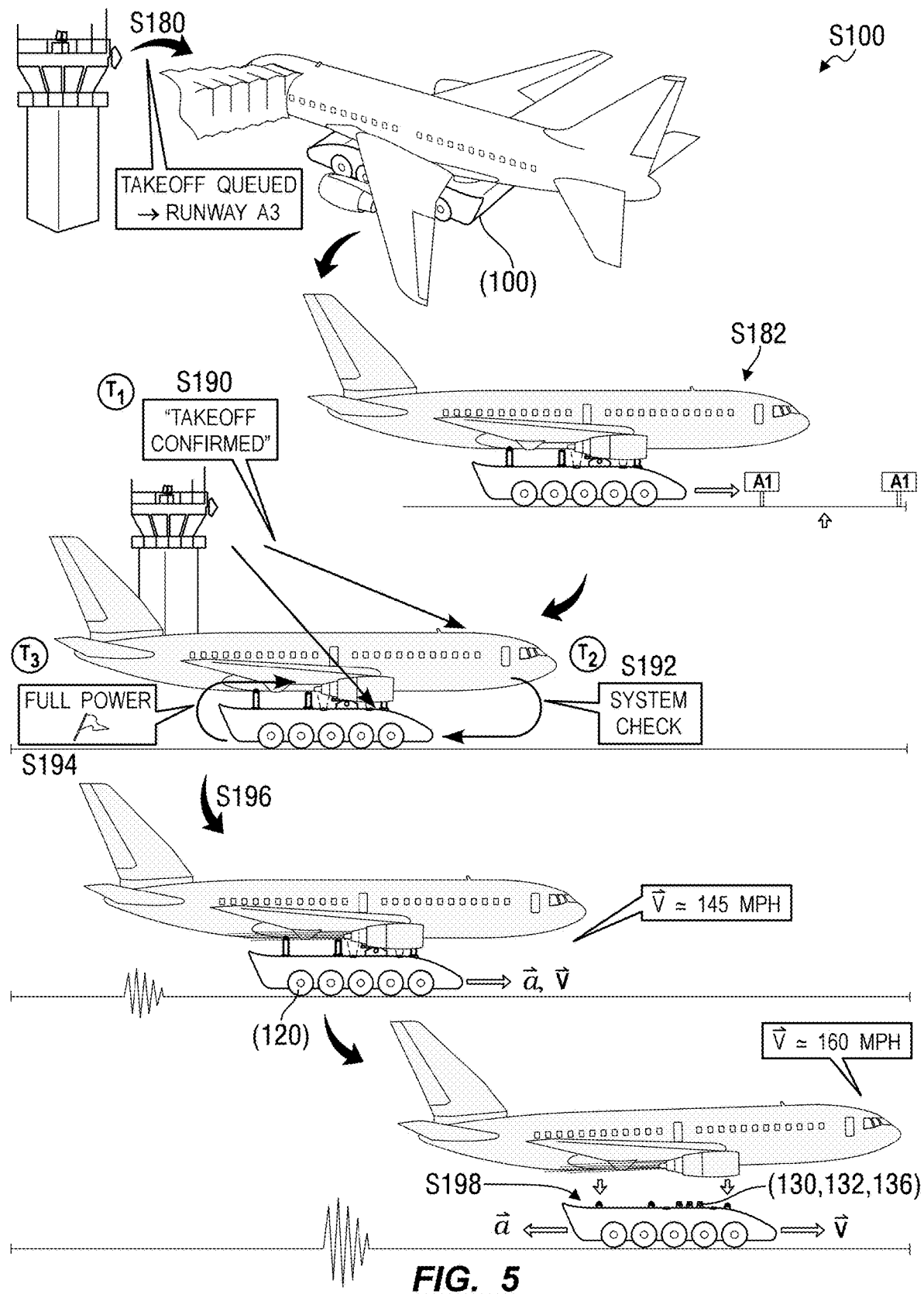
FIG. 5 is a flowchart representation of one variation of the method.

Generally, the tram 100 can operate at an airport to autonomously: actively "catch" an aircraft on its dorsal side as the aircraft approaches a runway during a landing routine, as shown in FIG. 4; decelerate the aircraft to a taxiing speed; taxi the aircraft—supported on its dorsal side—to a gate for unloading and loading; navigate back to the head of the runway in preparation for a takeoff routine, as shown in FIG. 5; and then accelerate the aircraft to a takeoff speed before releasing the aircraft during a takeoff routine, as shown in FIG. 5. In particular, the tram 100 can define a ground-based support vehicle for airport operations to autonomously assist aircraft during takeoff, landing, and taxiing, including assisting the aircraft: in accelerating along a linear runway during takeoff; coupling to the ground and decelerating during landing; and reaching an assigned gate when taxiing through the airport.

The tram 100 can interface with passenger aircraft to assume power supply requirements to accelerate the aircraft during takeoff and to assume power dissipation requirements during landing. For example, the tram 100 can include a set of electric motors delivering 10,000 horsepower through ground- or rail-based wheels, and the tram 100 can source electrical energy to power these electric motors from a local power grid (i.e., "the grid") via a power rail running along the runway. During a takeoff routine, the tram 100 can boost power available to the aircraft to accelerate to its takeoff speed, thereby reducing: fuel consumption by the aircraft during takeoff; a necessary pre-flight fuel load in the aircraft; takeoff weight of the aircraft; and total energy consumption for the aircraft to become airborne. Furthermore, because typical aircraft require 100% thrust (and 100% fuel consumption) at takeoff but only 70% of maximum thrust (e.g., and 70% of maximum fuel consumption) during cruise, the tram 100 can enable the aircraft to achieve takeoff and cruise metrics similar to those of typical aircraft but with smaller (e.g., lower maximum thrust) engines tailored for cruise efficiency—rather than compromised for both cruise and takeoff thrust requirements—by supplying additional power to accelerate the aircraft during takeoff. With engines now better tailored for cruise efficiency, the aircraft may exhibit greater fuel (or energy) efficiency during cruise. In light of reduced engine size and energy consumption during takeoff and cruise, the aircraft can include smaller fuel tanks, require smaller fuel loads to cover a particular distance, and thus define a smaller overall package, which yields further fuel and material efficiency gains. Because the aircraft is smaller, lighter, and contains engines yielding reduced maximum thrust, structural and mechanical systems in the aircraft can also be paired down in size and weight, thereby reducing product and maintenance costs for the aircraft.

The tram 100 "catches" the aircraft during a landing routine, carries the aircraft to its gate for unloading and loading, and then returns the aircraft to the runway and cooperates with the aircraft to accelerate to its takeoff speed without the aircraft (necessarily) contacting the ground. Because the tram 100 interfaces the aircraft with the ground, the aircraft can omit landing gear entirely or can include low-use or single-use landing gear (e.g., skid plates) only, such as for emergency landings exclusively. Weight of the aircraft can therefore be reduced through omission or simplification of landing gear, thereby improving fuel efficiency, reducing production cost, and/or increasing carrying capacity of the aircraft. Furthermore, less frequent or no use of landing gear in the aircraft can reduce need for redundancies in sensors and actuators for landing systems in the aircraft, reduce strength and load-carrying requirements of mounting locations for landing gear in the aircraft, such as to combat fatigue from repeated load cycles during takeoff and landing, thereby further reducing weight and production cost of the aircraft. By carrying the load of the aircraft across a cradle 140 and including systems to damp descent of the aircraft onto the tram 100, the tram 100 can also yield improved comfort for passengers in the aircraft during takeoff and landing.

As described below, the tram 100 can source power from the grid—via a power rail running along the runway—to accelerate the aircraft during takeoff; the tram 100 can also implement regenerative braking techniques and dump energy recuperated while decelerating the aircraft during a landing routine back into the grid via the power rail, thereby improving total efficiency of the aircraft and airport systems from takeoff to landing and reducing operational costs for the aircraft, the airport, and/or for airlines. The tram 100 can additionally or alternatively dissipate energy into a local energy storage system—such as a battery, flywheel, or hydraulic energy storage system integrated into the tram 100 or arranged under the tarmac and connected to the power rail—during a landing routine and then extract this energy back out of the onboard energy storage system during a subsequent takeoff routine. The tram can also supply power the aircraft while taxiing and/or while docked at a terminal, thereby eliminating a need for an auxiliary power generator onboard the aircraft.

The tram 100 can also interface with a power rail to power its drivetrain and run along a set of locating rails—distinct from or physically coextensive with the power rail—along a runway. By running along locating rails rather than a paved runway, the tram 100 can also enable elimination of tarmac at airports, which may further reduce construction, maintenance, and operating costs for the airport, such as by reducing or eliminating a need for runway deicing or clearing in cold and wet weather.

As described below, the tram 100 can interface with a remote computer system, such as an autonomous flight controller 160, to support autonomous takeoff, landing, and taxiing of aircraft at airports. In particular, passenger aircraft may implement autopilot techniques to navigate toward a destination while airborne. However, limited positional accuracy of geospatial location systems and varying conditions (e.g., wind directions and speed) near the ground may limit effectiveness of autopilot techniques to manage takeoff and landing of passenger aircraft. However, the tram 100 can interface with the remote computer system and/or the aircraft directly to track the geospatial location of the aircraft via a geospatial location sensor in the aircraft as the aircraft approaches the tram 100; as the location accuracy limit of the geospatial location sensor in the aircraft are reached, the tram 100 can transition to implementing computer vision techniques to track the position of the aircraft (e.g., fiducials positioned on the aircraft) relative to the tram 100 until the tram 100 engages and mechanically locks onto the aircraft. The tram 100 can also interface with a rail or other mechanical positioning structure on the ground to maintain a longitudinal position of the aircraft along a runway, even in the presence of changing ground conditions (e.g., crosswinds). The tram 100 can therefore cooperate with the remote computer system and the aircraft to achieve autonomous scheduling, taxiing, takeoff, cruise, and landing for aircraft, thereby further reducing operational costs of the aircraft over time.

The tram 100 is described herein as operated at an airport in conjunction with medium and large passenger airplanes. However, the tram 100 can additionally or alternatively be operated on a commercial or freight runway, a military base, an aircraft carrier, a small or private airport or runway, etc. in conjunction with private, passenger, freight, and/or military airplanes of any other size or type.

3. Chassis and Fairing

The chassis 100 functions to locate the drivetrain 120 and to support various subsystems of the tram 100, including the latch 130, alignment feature 132, sensors, controller 160 and fairings 112. For example, the chassis 100 can include a welded steel frame or monocoque steel, aluminum, or composite structure The chassis 100 can also be clad in aerodynamic fairings 112, such as metal or composite panels, to limit a drag coefficient of the tram 100 and to reduce lift at aircraft landing and takeoff speeds. The chassis 100 can also include ground effects structures that yield increasing downforce as the tram 100 accelerates to takeoff and landing speeds, thereby sucking the tram 100 to the ground and resisting lift off the ground by the aircraft during both takeoff and landing routines. For example, the tram 100 can include: Venturi tunnels extending along the underside of the chassis 100 and configured to induce a pressure drop between the underside of the tram 100 and the ground from the front of the tram 100 to the rear of the tram 100, thereby drawing the tram 100 down to the ground; a front inverted airfoil at the front of the tram 100 (e.g., over the front axle of the drivetrain 120) to smooth airflow toward the rear of the tram 100 and to increase load on the front of the tram 100 as the speed of the tram 100 increases; and a rear inverted airfoil at the rear of the tram 100 (e.g., over the rear axle of the drivetrain 120) to increase load on the rear of the tram 100 as the speed of the tram 100 increases. However, the chassis 100 can include fairings 112 or ground effects structures of any other type or form in order to: smooth airflow over the tram 100 at speed (e.g., to reduce turbulence that may otherwise disturb the aircraft as the aircraft approaches the tram 100 during a landing routine); and to yield increased downforce (i.e., inverse lift) on the tram 100 as the speed of the tram 100 increases to counter lift by the aircraft's wings during takeoff and landing routines.

4. Drivetrain

The drivetrain 120 is configured to accelerate and decelerate the chassis 100 along a runway. Generally, the drivetrain 120 is configured to output sufficient mechanical power in the forward direction to accelerate to and maintain a landing speed of a passenger aircraft within a limited distance (e.g., a "pre-runway" length of one-quarter of a mile) during a landing routine. The drivetrain 120 is similarly configured to output sufficient mechanical power in the forward direction—in cooperation with engines integrated into the aircraft—to accelerate the aircraft to a takeoff speed within a length of a runway during a takeoff routine. The drivetrain 120 is also configured to rapidly dissipate or transform kinetic energy to assist deceleration of the aircraft within the length of the runway during a landing routine and to slow the tram 100 following release of the aircraft during a takeoff routine.

4.1 Motive Force

In one variation shown in FIG. 1A, the tram 100 weights approximately 10,000 pounds and runs on twenty driven wheels expanding to approximately 24 inches in diameter at 2200 rpm (i.e., a landing speed of 157 mph). In this variation, the drivetrain 120 includes twenty brushless DC motors, each producing approximately 500 horsepower at 2000 rpm and connected directly to one drive wheel; the motors can thus product a total of 10,000 horsepower, which may be sufficient to accelerate the tram 100 (unloaded) to a landing speed of an aircraft (e.g., 157 mph) within one quarter of a mile (e.g., within 7.8 seconds) at 40% power. In this variation, the drivetrain 120 can source power from a DC or AC power rail extending along the runway, as described below. The tram 100 can also operate the motors in a generator mode to convert kinetic energy into electrical energy and feed this electrical energy back into the power rail to decelerate the tram 100 (and the aircraft during a landing routine).

Alternatively, the drivetrain 120 can include a gasoline, diesel, or turbine engine producing 12,000 horsepower and distributing power to its drive wheels through a gearbox exhibiting approximately 20% power loss in order to achieve similar acceleration and speed metrics. Yet alternatively, the drivetrain 120 can run on free wheels and include a jet or rocket engine configured to accelerate the tram 100. However, the drivetrain 120 can include any other one or more motors, engines, or other motive systems to accelerate the tram 100.

The drivetrain 120 can also include friction brakes, such as friction disk or drum brakes on each wheel. Alternatively, the drivetrain 120 can include electromechanical disk Eddy current brakes on its wheels. The drivetrain 120 that includes a jet or rocket engine can also include a reverse thruster, and the tram 100 can actuate the reverse thruster to slow the tram 100 and the aircraft during a landing routine or to slow the tram 100 following a takeoff routine. The drivetrain 120 that engages a location and/or power rail—as described below—can also include an electromagnetic element mounted to a rail follower 122 that runs along or adjacent the location and/or power rail; the tram 100 can power the electromagnetic element to induce Eddy currents in the rail, thereby slowing the tram 100, as described below.

4.2 Grid Power

In the variation described above in which the drivetrain 120 includes a set of electric motors, the drivetrain 120 can be configured to interface with an electrified power rail running the length of the runway, such as buried under the runway, extending above and to one side of the runway, or extending above ground and centered along the runway. In this variation, the tram 100 can include a rail follower 122 extending from the chassis 100, configured to engage the power rail, and configured to source electrical power from the power rail, as shown in FIGS. 1A and 1B. The drivetrain 120 can thus source power from the power rail via the rail follower 122 to power the set of electric motors during takeoff and landing routines.

In this variation, the power rail can extend from the runway to each gate in the airport, and the tram 100 can source power from the power rail via the rail follower 122 to power the electric motors as the tram 100 taxis an aircraft between the runway and assigned gates between landing and takeoff routines. Alternatively, the power rail can extend along the runway only, and the rail follower 122 can transiently engage the power rail proximal the front end of the runway and disengage the rail follower 122 proximal the terminus of the runway. In this implementation, the tram 100 can also include backup electric batteries or a backup generator to supply energy to the motors to transport the aircraft from the terminus of the runway to its assigned gate following a landing routine and then from its assigned gate back to the head of the runway in preparation for subsequent takeoff routine. The tram 100 can additionally or alternatively include a power coupling adjacent the latch 130 and configured to engage a power receptacle on the underside of the fuselage of the aircraft; in this implementation, the tram 100 (e.g., the controller 160) can trigger the rail follower 122 to retract from or disengage the power rail upon conclusion of a landing routine, and the drivetrain 120 can source power from the aircraft via the power coupling—during navigation from the terminus of the runway to an assigned gate in the airport and later back to the head of the runway for a subsequent takeoff routine—following retraction of the rail follower 122 from the power rail. For example, once the tram 100 engages and latches onto the aircraft, the aircraft can deactivate its primary engines, maintain its auxiliary engine as active, and supply sufficient power to the drivetrain 120 via the power coupling to navigate the tram 100 and the aircraft to an assigned gate.

In this variation, the drivetrain 120 can also operate the electric motors in a generator mode to transform kinetic energy into electrical energy and then feed this electrical energy back into the power rail (and therefore back into the "grid") via the rail follower 122, thereby recovering energy while slowing the tram 100 following a takeoff routine or slowing the tram 100 and the aircraft during a landing routine. For example, once the latch 130 on the tram 100 engages a corresponding latch receiver on the aircraft during a landing routine, as described below, the controller 160 can trigger the drivetrain 120 to transition the electric motors into the generator mode to feed energy back into the power rail via the rail follower 122 in order to actively decelerate the chassis 100 and the aircraft.

In the variation described above in which the rail follower 122 includes an electromagnetic element configured to run along the power rail, the drivetrain 120 can additionally or alternatively supply power to the electromagnetic element to induce Eddy currents in the power rail, thereby slowing the tram 100. For example, the drivetrain 120 can transition the electric motors into the generator mode to feed electrical energy to the electromagnetic element on the rail follower 122 to induce Eddy currents in the power rail to slow the chassis 100 and the aircraft following engagement of the latch 130 during the landing routine; the tram 100 can also feed excess electrical energy not needed to energize the electromagnetic element back into the power rail in order to recuperate this energy, as described above. The tram 100 can additionally or alternatively include a rail follower 122 that interfaces with a location rail, as described below; the drivetrain 120 can implement similar methods and techniques to brake the tram 100 against the location rail by supplying power to an electromagnetic element in the rail follower 122 to induce Eddy currents in the location rail.

The rail follower 122 can also be mounted to a suspension system configured to absorb variations in distance of the power rail below (or adjacent) the tram 100 along the length of the runway. Furthermore, for the power rail that defines an undercut feature, the rail follower 122 can engage the undercut features, and the tram 100 can passively or actively tension the rail follower 122 against the power rail to vertically retain the tram 100 over the power rail, such as to brace the tram 100 against lifting off of the runway (or off of the rail) as the aircraft ascends during a takeoff routine.

However, the tram 100 can source and supply power from and to the power rail in any other way. The tram 100 can also include multiple rail followers, such as a front rail follower proximal a front of the tram 100 and a rear rail follower proximal a rear of the tram 100.

4.3 Lateral Location

In one variation as shown in FIG. 1B, the drivetrain 120 is configured to interface with a location rail, such as distinct from or physically coextensive with the power rail described above, configured to laterally locate the tram 100 along the length of the runway. In particular, the location rail can be configured to retain the lateral position of the tram 100—such as against lateral loads due to crosswinds—as the tram 100 moves along the length of the runway during takeoff and landing routines. For example, the location rail can be integrated into the runway or can be elevated above a ground surface to define a linear elevated runway. For example, the location rail can define a monorail, or the runway can include a pair of parallel and offset location rails.

The drivetrain 120 can include one or a set of rail followers configured to engage the location rail(s), and the location rail(s) can resist lateral movement of the tram 100 (e.g., "drift") relative to the longitudinal axis of the runway via the rail follower(s). Wheels in the drivetrain 120 can also act directly on the location rail(s) to accelerate the tram 100 forward.

In this variation, like the power rail, the location rail can define an undercut, and the rail follower 122 on the tram 100 can extend over and engage the undercut to vertically retain the tram 100 to the location rail during takeoff and landing routines, as shown in FIG. 1B. For example, the rail follower 122 can include a free wheel configured to engage the undercut on the location rail, and the tram 100 can preload the rail follower 122 in tension against the location rail.

However, the drivetrain 120 can interface with one or more power and/or location rails in any other way to source power, to sink power, to locate the tram 100 laterally along a runway, and to locate the tram 100 vertically along the runway.

5. Aircraft Engagement Mechanisms

As shown in FIGS. 1B, 2A, and 2B, the latch 130 is coupled to the chassis 100 and is configured to selectively engage a latch receiver mounted to an underside of a fuselage of an aircraft; and an alignment feature 132 is arranged adjacent the latch 130, is configured to selectively engage an alignment receiver mounted to the underside of the fuselage of the aircraft, and is configured to communicate forces parallel to an anteroposterior axis of the chassis 100 into the aircraft. Generally, the latch 130 and the alignment feature 132 cooperate to transiently engage like features on the aircraft (e.g., on the fuselage and/or on the wings of the aircraft): to "catch" and decelerate the aircraft during a landing routine; and to accelerate and then release the aircraft during a takeoff routine.

In particular, the tram 100 includes one or more alignment features, such as in the form of alignment pins, configured to make first contact with like features on a fuselage of an aircraft and prior to actuation of the latch 130 during the landing routine. Once the alignment feature(s) meets and is inserted into or receives an alignment receiver on the aircraft during a landing routine, the controller 160 can trigger the latch 130 to engage the latch receiver on the aircraft, thereby retaining the aircraft against the tram 100. The tram 100 can then decelerate, and the alignment feature(s) and the latch 130 can communicate force into the aircraft longitudinally to decelerate the aircraft to a taxiing speed. Similarly, during a takeoff routine, the alignment feature(s) and the latch 130 can communicate force into the aircraft longitudinally to accelerate the aircraft to a takeoff speed. Therefore, the alignment feature(s) and the latch 130 can cooperate to communicate fore and aft forces from the tram 100 into the aircraft when the tram 100 accelerates (i.e., during takeoff routines) and brakes (i.e., during landing routines), respectively.

The tram 100 can also include a cradle 140 configured to support an area of the underside of the aircraft, such as during a takeoff cycle until the aircraft creates sufficient lift to ascend off of the tram 100 and during a landing cycle once the aircraft has slowed sufficiently to descend into full contact with the tram 100. Together, the latch 130, the alignment feature 132, and the cradle 140 can define a "dock" on the tram 100.

5.1 Aircraft Receiver

As shown in FIG. 2B, the aircraft can be manufactured or retrofit with an aircraft receiver system defining: a latch receiver configured to engage the latch 130 and integrated into a structural region of the aircraft, such as along the underside of the fuselage between the primary wings of the aircraft, an alignment receiver configured to receive the alignment feature 132 on the tram 100; and cradle points 142, such as including hard points (e.g., structural load surfaces), arranged across the underside of the fuselage and/or wings of the aircraft, such as one cradle point 142 under each of the left and right primary wings, the nose, and the tail of the aircraft.

The aircraft can also be manufactured or retrofit with multiple aircraft receiver systems, each configured to interface with one dock on the tram 100.

5.2 Alignment Feature and Latch

In one implementation shown in FIG. 3, an alignment receiver on the aircraft includes a tapered bore extending into the fuselage of the aircraft; and the alignment feature 132 includes a tapered (e.g., conical, frustoconical) alignment pin extending upwardly from the tram 100 and defining an external taper matched to the alignment receiver on the aircraft. Thus, as the aircraft descends toward the tram 100 and/or as the tram 100 raises the dock toward the aircraft during a landing routine, the alignment pin can self-center on its corresponding alignment receiver in the aircraft. In this implementation, the latch 130 can define an overcam latch including an electromechanical actuator configured to rotate the latch 130 forward (e.g., from a recessed position below the dock) into contact with the latch receiver on the aircraft. Once the alignment pin is sufficiently inserted into its alignment receiver, the tram 100 (e.g., the controller 160) can trigger the electromechanical actuator to advance the latch forward past its overcam position, which can draw the latch 130 into contact with the latch receiver on the aircraft and then downward toward the dock, thereby drawing the fuselage into the dock (or raising the dock toward the aircraft) and locking the latch 130 against the latch receiver in this overcam position.

In another implementation shown in FIGS. 2A and 2B, the latch 130 and the alignment feature 132 are physically coextensive. In one example, the alignment feature 132 defines an external frustoconical section and a set of bores extending (substantially) perpendicular to the axis of the frustoconical section. The latch 130 can include a set of bearings arranged in and captured by bores in the alignment feature 132; and an expansion driver running inside the alignment feature 132 and defining a shoulder configured to drive the set of ball bearings outwardly in their bores in an advanced position and configured to release the ball bearings back into the bores in a retracted position. In this implementation, the alignment receiver can define an internal frustoconical section and an internal shoulder. During a landing routine, the tram 100 (e.g., the controller 160) can trigger a latch 130 actuator to transition the expansion driver from the retracted position into the advanced position to lock the set of ball bearings against the shoulder in the alignment receiver in response to insertion of a threshold length of the alignment feature 132 on the tram 100 into the alignment receiver on the aircraft (e.g., in response to descent of the alignment receiver onto the alignment feature 132) during a landing routine, thereby retaining the aircraft against the tram 100 prior to triggering the drivetrain 120 to actively brake the tram 100 and the aircraft. Similarly, the controller 160 can trigger the latch 130 actuator to transition the expansion from the advanced position into the retracted position to release the set of ball bearings and to permit the set of ball bearings to retract from the shoulder in the alignment receiver, thereby releasing the alignment receiver from the alignment feature 132 and releasing the aircraft from the tram 100, in response to acceleration of the chassis 100 and the aircraft to a takeoff speed specified for the aircraft and/or in response to detecting a threshold tension on the alignment feature 132, which may indicate achievement of a target lift on the aircraft during a takeoff routine. Therefore, in this implementation, the latch 130 and alignment feature 132 can define an integrated quick-release mechanism for transiently engaging, aligning with, and locking against an aircraft receiver system arranged on an aircraft.

The tram 100 can also include multiple discrete or integrated latches (the first latch 130, a second latch 130B, and a third latch 130C) and/or alignment features (e.g., the first alignment feature 132, a second alignment feature 132B, and a third alignment feature 132C). For example, the tram 100 can include four alignment features arranged in a diamond pattern, including an alignment feature 132 proximal each of the nose, left wing-to-fuselage junction, right wing-to-fuselage junction, and the tail of the aircraft to transiently support the aircraft in six degrees of freedom once engaged to alignment receivers in like locations on the aircraft. In this example, the tram 100 can include a similar arrangement of latches adjacent or integrated into these four alignment features. However, the latch 130 and the alignment feature 132 in the tram 100 can define any other common or separate structure, and the tram 100 can include any other number or arrangement of latches and alignment features. The aircraft receiver system can similarly include any other number and arrangement of latch receivers and the alignment receivers defining common or separate structures configured to mate with corresponding latches and alignment features on the tram 100.

5.4 Cradle

As described above and shown in FIGS. 1A and 3, the tram 100 can include a cradle 140 configured to support the aircraft during acceleration and deceleration along a runway, such as against rotation in pitch, yaw, and roll during takeoff and landing routines. For example, the cradle 140 can define a scalloped bed extending along the top of the tram 100 parallel to the anteroposterior axis of the tram 100 and configured to receive the fuselage and/or wings of an aircraft. In this example, the scalloped bed can define a generic geometry configured to accept a standard fuselage geometry or can define a geometry matched to a size, class, make, or model of aircraft.

The cradle 140 can additionally or alternatively include a set of cradle points 142 configured to contact and support corresponding hard points defined across the underside of the fuselage and/or wings of the aircraft, as shown in FIGS. 1A, 1B, and 3. In one implementation, the cradle points 142 can be fixedly coupled to the tram 100 in a generic cradle 140 pattern and at generic heights such that the cradle points 142 mate with hard points arranged in a generic three-dimensional pattern in a variety of aircraft of different sizes, classes, makes, or models.

In the foregoing implementation, the cradle points 142 can also be adjustable. For example, the cradle 140 can include a set of (e.g., four) cradle points 142, each mounted to a retractable pin coupled to the chassis 100 to define an adjustable support pin configured to extend and retract to a target location to meet a corresponding hard point on the fuselage of an aircraft—caught by the tram 100 during a landing routine—based on known vertical positions of hard points on aircraft of this type. In particular, during a landing routine, the controller 160 can access a database of vertical positions of hard points arranged across the aircraft and extend the set of retractable pins according to the database of vertical positions in order to engage each cradle point 142 with its corresponding hard point on the aircraft.

In the foregoing example, the tram 100 (e.g., the controller 160) can also extend the adjustable pins to meet corresponding hard points on the aircraft once the latch 130 engages the latch receiver on the aircraft and before triggering the drivetrain 120 to decelerate in order to support the aircraft, particularly against pitching forward. The tram 100 can also actively support the aircraft and (slowly) retract the adjustable pins and the latch 130 down into the scalloped bed as the aircraft decelerates and creates reduced total lift. Therefore, the cradle 140 can include a set of cradle points 142 of adjustable height to accommodate multiple unique types of aircraft of different geometries and containing cradle feature points 142 in the same plan orientation but at different heights across the aircraft, as shown in FIGS. 1A, 1B, and 3.

In a similar implementation, the cradle 140 includes multiple adjustable cradle points 142 distributed across the top of the tram 100, and the tram 100 selectively extends a subset of these adjustable cradle points 142 to meet corresponding hard points on an aircraft based on a type of the aircraft as the aircraft descends onto the tram 100 during a landing routine. For example, the cradle 140 can include: a first set of four adjustable cradle points 142 distributed according to a unique cradle 140 pattern for small aircraft; a second set of four adjustable cradle points 142 distributed according to a unique cradle 140 pattern for medium-sized aircraft; and a third set of four adjustable cradle points 142 distributed according to a unique cradle 140 pattern for large aircraft. In this example, as the tram 100 retracts an aircraft downward into the cradle 140 during a landing routine, the tram 100 can extend one of these sets of adjustable cradle points 142 to preset heights to meet corresponding hard points on the aircraft based on the known type and size of the aircraft, such as described above.

In the foregoing implementation, each hard point on the aircraft can define an extended hard surface, such as a substantially planar 200-millimeter-square surface. Each cradle point 142 can be tipped with a bearing or caster configured to run across a corresponding hard surface on the aircraft to provide continuous vertical support to the aircraft during takeoff and landing routines, such as while the aircraft rotates about the dorsoventral axis of the tram 100 into alignment with the anteroposterior axis of the tram 100 while slowing in the presence of a crosswind during a landing routine or as the aircraft rotates about the dorsoventral axis of the tram 100 out of alignment with the anteroposterior axis of the tram 100 while accelerating in the presence of a crosswind during a takeoff routine.

5.5 Motion Platform: Degrees of Freedom

In one variation shown in FIGS. 1B and 2A, the dock (e.g., the latch 130 and the alignment feature 132) are integrated into a motion platform 134 that enables active or passive adjustment of the orientation of the latch 130 and the alignment features relative to the chassis 100 during takeoff and landing routines.

In one implementation, the motion platform 134 includes a gimbal arranged over the cradle 140 on the top of the tram 100 and exhibiting adjustable pitch, yaw, and roll axes. In this implementation, the dock can be arranged on the gimbal (i.e., coupled to the chassis 100 via the gimbal). The tram 100 can also include a set of gimbal actuators coupled to each gimbal axis and configured to actively adjust angular positions of the pitch, yaw, and/or roll axes of the gimbal to actively align the alignment feature 132 to it corresponding alignment receiver in the fuselage as the aircraft approaches the tram 100 during a landing routine. In particular, the tram 100 (e.g., the controller 160) can actively adjust the pitch, yaw, roll, vertical and/or lateral positions of the gimbal on the chassis 100 to align the alignment feature 132 with the corresponding alignment receiver on the chassis 100 based on optical data collected by the optical sensor 150 during a landing routine, as described below; the tram 100 can also unlock axes of the gimbal during a takeoff routines and once the latch 130 has engaged the latch receiver during a landing routine (Alternatively, the gimbal can include free (i.e., controlled) axes; the alignment feature 132 can include an electromagnetic element; and the corresponding alignment receiver in the aircraft can include a ferrous or magnetic element. In this implementation, as the aircraft approaches and lowers over the tram 100 during a landing routine, the tram 100 can actuate the electromagnetic element in the alignment feature 132, which then magnetically couples to the ferrous element in the corresponding alignment receiver to draw the alignment feature 132 toward and into contact with the alignment receiver on the fuselage of the aircraft, thereby also drawing the gimbal toward the aircraft and aligning the latch 130 with its corresponding latch receiver on the aircraft.)

In the variation described above in which the tram 100 interfaces with a location rail in the runway for lateral location of the tram 100 during takeoff and landing routines, the tram 100 also include a lateral adjustment subsystem 135 configured to move the motion platform 134—and therefore the dock—laterally relative to the tram 100 in order to laterally align the alignment feature 132 to the alignment receiver on the aircraft, as shown in FIG. 2A. In particular, because the lateral position of the chassis 100 may be controlled (e.g., substantially fixed) by the rail extending along the runway, the motion platform 134 can include a lateral adjustment subsystem 135—mounted between the chassis 100 and the dock—in order to accommodate lateral misalignment of the aircraft to the tram 100 during a landing routine. As described below, the tram 100 can track the position of the aircraft above relative to the tram 100—such as based on optical fiducials detected in optical images recorded by the optical sensor 150 once the aircraft descends to within a threshold distance above the tram 100—and can actively drive the motion platform 134 to a lateral position that aligns the alignment feature 132 to the corresponding alignment receiver on the aircraft above during a landing routine.

5.6 Telescoping Boom

In another variation shown in FIGS. 1B and 2A, the tram 100 includes a telescoping boom 136 that supports the dock—via the motion platform 134—on the chassis 100 and that can be actively raised and lowered relative to the chassis 100, such as to recess the dock below the cradle 140 (e.g., after releasing the aircraft during a takeoff routine) and to extend the dock up to one meter above the cradle 140 (e.g., just before engaging the aircraft during a landing routine). For example, the telescoping boom 136 can include a hydraulic ram capable of lifting and retracting 500 tons (e.g., the weight of a fully-laden large passenger aircraft) over one meter above the chassis 100.

During a landing routine, the tram 100 (e.g., the controller 160) can actively control a boom actuator (e.g., a hydraulic pump and valve system) to extend the telescoping boom 136, thereby raising the dock above the chassis 100 to meet the aircraft, as shown in FIG. 4. Once the latch 130 and alignment feature 132 have engaged and latched to the fuselage, the tram 100 can actively retract the telescoping boom 136 to draw the aircraft into the cradle 140, such as for the tram 100 that is vertically located and retained by a rail extending along the runway, as described above. Alternatively, once the latch 130 and alignment feature 132 have engaged and latched to the fuselage, the tram 100 can open a relief valve on the hydraulic pump to release the telescoping boom 136 to move vertically with the aircraft as the aircraft descends, thereby limiting transmission of lift from the aircraft into the tram 100, which may otherwise reduce braking force of the drivetrain 120 and/or upset airflow under the tram 100 as the tram 100 is lifted from the runway. Therefore: the telescoping boom 136 can couple the dock to the chassis 100 and can be configured to raise the latch 130 and the dock above the chassis 100 to meet the aircraft during the landing routine; and the controller 160 can extend the telescoping boom 136 upward to mate the alignment feature 132 to the alignment receiver on the aircraft. Once the latch engages the latch features, the controller can retract the telescoping boom 136 to draw the aircraft into the cradle 140 and to mate the set of cradle points 142 in the cradle 140 to hard points defined across the aircraft in response to engagement of the latch 130 with the latch receiver.

Similarly, during a takeoff routine, the tram 100 can unlock the telescoping boom 136, thereby permitting the telescoping boom 136 to freely extend while the tram 100 continues to communicate force into the aircraft in the forward direction, as shown in FIG. 5. In particular as the speed of the tram 100 and aircraft increases, the aircraft's wings create greater lift, which causes the aircraft to ascend off of the cradle 140 and extends the telescoping boom 136. By unlocking the telescoping boom 136, the tram 100 can thus decouple ascension of the aircraft from motion of the tram 100. Once the telescoping boom 136 reaches a target extended length (or a threshold height above the chassis 100), the controller 160 can trigger the latch 130 to release the latch receiver. Once the latch 130 releases the latch receiver, the tram 100 can rapidly retract the telescoping boom 136—such as to bring the dock flush or below the cradle 140—in order to prevent impact between the aircraft and the dock once the aircraft and the dock separate. For example, the tram 100 can (rapidly) retract the telescoping boom 136 once the latch 130 is released in order to prevent damage to the fuselage of the aircraft in the event of a slight drop in the aircraft's altitude during takeoff, such as due to a wind gust. Once the aircraft has reached a predefined altitude above the tram 100 (e.g., two meters), the tram 100 can decelerate and autonomously return to the head of the runway to execute a landing routine with another aircraft.

In this variation, the tram 100 can similarly extend cradle points 142 in the cradle 140 to maintain contact with the hard points on the aircraft as the telescoping boom 136 rises during a takeoff routine. For example, the tram 100: can measure load or force on each cradle point 142 via load cells or other sensors in the cradle 140 throughout the takeoff routine (e.g., at a sampling rate of 10 Hz); and can actively adjust the vertical position of each cradle point 142 to achieve a substantially uniform load across all cradle points 142 in contact with the aircraft—such as up to a threshold roll angle of the aircraft and/or within predefined pitch angle limits for the aircraft (e.g., to prevent the aircraft's tail from containing the runway during ascent)—thereby achieving substantially uniform support across hard points on the aircraft as the aircraft accelerates, pitches back, and ascends during the takeoff routine.

Furthermore, in this variation, the tram 100 can adjust output of the boom actuator to actively damp the telescoping boom 136. For example, during a takeoff routine, the tram 100 can actively adjust a pressure behind the telescoping boom 136 (e.g., by controlling pressure output of the boom actuator) in order to actively damp forces communicated downward into the telescoping boom 136 by the aircraft, thereby softening rapid drops in altitude of the aircraft (e.g., due to local wind gusts). However, in this example, the tram 100 can permit (substantially) free motion of the telescoping boom 136 in the upward direction in order to prevent the aircraft from lifting the tram 100 off of the runway as it ascends.

During a takeoff routine, the tram 100 can also preload the telescoping boom 136 (and the adjustable cradle points 142) in extension in order to actively promote ascension of the aircraft off of the tram 100. For example, for an aircraft with an average or common takeoff weight of approximately 350 tons, the tram 100 can power the boom actuator to preload the telescoping boom 136 with 50 tons of lift.

However, the tram 100 can include a telescoping boom 136 of any other form and actuated in any other way. The tram 100 can similarly include a single- or multi-jointed arm similarly configured: to elevate the dock into alignment with the fuselage of the aircraft; to lower into the cradle 140 as the aircraft descends during a landing routine; and to rise with the aircraft as the aircraft ascends during a takeoff routine.

5.7 Tram Load

The tram 100 can also measure a laden weight of the aircraft once loaded into the cradle 140 and prior to initiating a takeoff routine. For example, in the variation described above in which the tram 100 includes a telescoping boom 136 actuated by a hydraulic pump and valve system, the controller 160 can record a pressure in the hydraulic system—via a pressure sensor coupled to a supply or return line—necessary to carry the aircraft while the tram 100 is static, and the controller 160 can convert this pressure into a weight of the aircraft based on a cross-sectional area of the telescoping boom 136. Alternatively, the tram 100: can include a pressure sensor or strain gauge integrated into or arranged under the dock, and the controller 160 can sample the pressure sensor or strain gauge to determine the laden weight of the aircraft. The controller 160 can then set various takeoff parameters—such as preload on the telescoping arm and acceleration rate of the drivetrain 120—based on the laden weight of the aircraft.

6. Controller and Sensors

As shown in FIGS. 1A and 1B, the tram 100 includes a controller 160 configured to sample various sensors and to control various actuators in the tram 100 while in operation in order to autonomously execute landing, taxiing, and takeoff routines, as described below.

As shown in FIGS. 1A, 1B, and 2A, the tram 100 further includes an optical sensor 150 that faces upwardly from the chassis 100 and is configured to output a sequence of optical images. For example, the optical sensor 150 can include: a color (e.g., RGB) camera; a color camera with a color filter (e.g., a filter in the red, blue, or green color spectrums); or an infrared camera mounted to the motion platform 134 or to the dock adjacent the alignment feature 132.

During a landing routine, the controller 160 can: sample the optical sensor 150 regularly, such as at a rate of 15 Hz; implement computer vision techniques to detect, identify, and track the position of an optical fiducial—arranged on the aircraft—in the field of view of the optical sensor 150; adjust a speed (e.g., a power output) of the drivetrain 120 in order to maintain longitudinal alignment between the alignment feature 132 on the tram 100 and the alignment receiver on the aircraft based on positions of the optical fiducial in the field of view of the optical sensor 150; and adjust the position of the motion platform 134 and/or telescoping boom 136 in order to maintain pitch, yaw, roll, and lateral alignment between the alignment feature 132 on the tram 100 and the alignment receiver on the aircraft similarly based on positions of the optical fiducial in the field of view of the optical sensor 150, as shown in FIG. 4.

In one implementation, the aircraft includes an active optical fiducial on its fuselage, such as in the form of a lamp or cluster of lamps outputting light at a particular wavelength (e.g., in the visible or infrared spectrums) and/or blinking at a particular frequency, as shown in FIG. 1B. In this implementation, the optical sensor 150 can include a filter that passes light within a narrow spectrum containing the output wavelength of the active optical fiducial; and the controller 160 can detect and identify the optical fiducial in the field of view of the optical sensor 150 based on presence of a bright region in an optical image recorded by the optical sensor 150. Alternatively, the optical sensor 150 can output a sequence (e.g., a video stream) of unfiltered optical images, and the controller 160 can detect and identify the optical fiducial based on a color, intensity, pattern, and/or flutter rate of the groups of pixels in these optical images.

Once the controller 160 detects and identifies the optical fiducial on the aircraft in a field of view of the optical sensor 150 (i.e., substantially in real-time), the controller 160 can implement object tracking techniques to track the optical fiducial over time. The controller 160 can also implement known intrinsic and/or extrinsic parameters of the optical sensor 150, such as a known orientation and position of the field of view of the optical sensor 150 relative to the alignment feature 132 and distortion of the optical sensor 150, to calculate a location of a target pixel in an optical image that, when coincident the centroid of the optical fiducial represented in the optical image, indicates that the alignment feature 132 is aligned in translation to the corresponding alignment receiver in the aircraft, as shown in FIG. 4. Once the controller 160 identifies the optical fiducial in an optical image, the controller 160 can calculate a centroid of the optical fiducial and calculate a lateral offset and a longitudinal offset of the centroid from the target pixel. The controller 160 can then trigger the drivetrain 120 to accelerate or decelerate based on whether the centroid of the optical fiducial is ahead of or behind the target pixel; similarly, the controller 160 can trigger the motion platform 134 to shift left or shift right based on whether the centroid of the optical fiducial is to the right or to the left of the target pixel. The controller 160 can repeat this process for each optical image received from the optical sensor 150. Therefore, the controller 160 can interface with an actuator in the tram 100 to adjust a lateral position of the motion platform 134 described above to align the alignment feature 132 with its corresponding alignment receiver on the aircraft by maintaining the first optical fiducial proximal a first target position in the first sequence of optical images as the aircraft approaches the runway during the landing routine, as shown in FIG. 4.

The aircraft can include multiple distinct optical fiducials or a pattern of optical fiducials, such as outputting different wavelengths (e.g., colors) of light and/or blinking at different rates. The controller 160 can thus implement the foregoing methods and techniques to: detect and track each optical fiducial in an optical image received from the optical sensor 1500; calculate target locations for each optical fiducial in these optical images to align the alignment feature 132 to it corresponding alignment receiver; and then adjust the position of the motion platform 134 on the tram 100 according to deviation of the actual locations of the optical fiducials from their target locations. In this implementation, the controller 160 can also calculate a distance of the aircraft from the dock based on distances between optical fiducials represented in these optical images—such as based on a known geometry and dimensions of the optical fiducial pattern on the aircraft—and then extend the telescoping boom 136 upward to reduce this distance as the aircraft descends toward the tram 100. For example, the controller 160 can calculate offset distances from the alignment feature 132 to the alignment receiver on the aircraft based on distances between a first optical fiducial and a second optical fiducial detected in the first sequence of optical images; once such an offset distance from the alignment feature 132 to the alignment receiver on the aircraft drops below a threshold distance, the controller 160 can transition: from implementing closed-loop controls to adjust speed of the drivetrain 120 to sequentially arrive at tram waypoints in a predefined sequence of tram waypoints concurrent with receipt of confirmations of arrival of the aircraft at corresponding aircraft waypoints in a predefined sequence of aircraft waypoints, as described below; to implementing closed-loop controls to adjust speed of the drivetrain 120 and a position of the alignment feature 132 relative to the chassis 100 based on positions of the optical fiducials detected in optical images recorded by the optical sensor 150, as shown in FIG. 4.

Similarly, the controller 160 can: calculate an angular offset of the aircraft relative to the alignment feature 132 about pitch, yaw, and/or roll axes based on relative sizes and positions of the optical fiducials detected in the optical images and based on a known geometry and dimensions of the optical fiducial pattern on the aircraft; and then adjust the pitch, yaw, and/or roll position of the motion platform 134 to reduce these angular offsets. The controller 160 can repeat this process for each optical image received from the optical sensor 150 once the aircraft reaches a threshold distance from the tram 100.

Furthermore, the tram 100 can include multiple optical sensors, such as one optical sensor 150 adjacent each of multiple alignment features on the dock, as shown in FIG. 2A, and the controller 160 can fuse positions of optical fiducials detected in groups of optical images recorded by the set of optical sensors to adjust the position of the dock and/or the speed of the tram 100 in real-time. For example, the tram 100 can include: a first alignment feature 132 arranged on the motion platform 134; a second alignment feature 132 arranged on the motion platform 134 and offset from the first alignment feature 132; a third alignment feature 132 arranged on the motion platform 134 and offset from the first alignment feature 132 and the second alignment feature 132; a first optical sensor 150 arranged at a first location on the motion platform 134 adjacent a first alignment feature 132; a second optical sensor 150B arranged on the motion platform 134 adjacent the second alignment feature 132; and a third optical sensor 150C arranged on the motion platform 134 adjacent the third alignment feature 132. In this example, the controller 160 adjusts a speed controller 16o and a braking system in the drivetrain 120 and adjusts a position of the motion platform 134 relative to the chassis 100 to: maintain a first optical fiducial (e.g., emitting infrared light at a first wavelength) on the aircraft proximal a first target position in a first field of view of the first optical sensor 150, maintain a second optical fiducial (e.g., emitting infrared light at a second wavelength) on the aircraft proximal a second target position in a second field of view of the second optical sensor 150B, and maintain a third optical fiducial (e.g., emitting infrared light at a third wavelength) on the aircraft proximal a third target position in a third field of view of the third optical sensor 150B, such as from a time that the aircraft is within a threshold distance of the tram 100 until the first alignment feature 132 engages a first alignment receiver in the aircraft, the second alignment feature 132 engages a second alignment receiver in the aircraft, and the third alignment feature 132 engages a third alignment receiver in the aircraft. Therefore, in this implementation: the aircraft can include optical fiducials adjacent alignment receivers; the tram 100 can include an optical sensor 150 adjacent each alignment feature 132; and the controller 160 can implement closed-loop controls to adjust the speed of the aircraft and the position of the motion platform 134 during a landing routine to maintain the position of these optical fiducials in target positions in the fields of view of corresponding optical sensors until the alignment features meet and engage corresponding alignment receivers in the aircraft, as which time the controller 160 can trigger the latch 130 to engage the latch receiver on the aircraft.

As described above, the tram 100 can also include multiple docks, such as arranged on independently-actuated motion platforms (e.g., gimbals), as shown in FIG. 3. In this implementation, the controller 160 can implement the foregoing methods and techniques to independently align each alignment feature on each dock with its corresponding alignment receiver on the aircraft. For example, the tram 100 can include: a front gimbal arranged proximal a front of the chassis 100; a latch 130 arranged on the front gimbal and configured to selectively engage a front latch receiver arranged proximal a front of the fuselage of the aircraft; a first alignment feature 132 arranged on the front gimbal adjacent the front latch and configured to selectively engage a front alignment receiver arranged proximal the front of the fuselage of the aircraft; a rear gimbal arranged proximal a rear of the chassis 100; a rear latch arranged on the rear gimbal and configured to selectively engage a rear latch receiver arranged proximal a rear of the fuselage of the aircraft; and a rear alignment feature 132 arranged on the rear gimbal adjacent the rear latch, configured to selectively engage a rear alignment receiver arranged proximal the rear of the fuselage of the aircraft, and configured to cooperate with the front alignment feature 132 to communicate forces parallel to the anteroposterior axis of the chassis 100 into the aircraft. In this example, the controller 160 can independently adjust lateral positions of the front gimbal and the rear gimbal to accommodate a yaw angle of the aircraft, such as in the presence of a headwind during approach of the aircraft toward the runway, by aligning the first alignment feature 132 with the first alignment receiver on the aircraft and aligning the rear alignment feature 132 with the rear alignment receiver on the aircraft, such as according to positions of optical fiducials detected in optical images recorded by distinct optical sensors arranged on the front and rear gimbals as described above.

7. Communications

The tram 100 can also include a wireless communication module 152 configured to communicate over (medium- or long-range) wireless communication protocol with a remote computer system, such as with a remote control tower over the Internet to receive a sequence of tram waypoints and/or triggers to execute a takeoff or landing routine, as described below. The wireless communication module 152 can additionally or alternatively communicate with aircraft over (short-range) wireless communication protocol, such as to receive confirmation of a system check at the aircraft prior to executing a takeoff routine, as described below.

Furthermore, the tram 100 can include a geospatial location sensor 154 configured to interface with an external geospatial network to track a geospatial location and/or orientation of the tram 100 such as at a rate of 10 Hz during execution of a landing routine. The tram 100 can return its geospatial locations and/or orientations to the aircraft and/or to the remote computer system via the wireless communication module 152, such as to enable the remote computer system to update tram waypoints for the tram 100 in real-time based on the geospatial location of the tram 100 relative to the geospatial location of the aircraft, as described below.

8. Landing Routine

In one variation shown in FIG. 4, the tram 100 interfaces with the remote computer system (e.g., the control tower) to execute a landing routine method S100, including, at the remote computer system: assigning a sequence of aircraft waypoints—to an aircraft—along a landing approach path and along a runway at an airport in Block S110; assigning a sequence of tram waypoints—to a tram—along the runway in Block S112; prompting the tram 100 to navigate to a first tram waypoint, in the sequence of tram waypoints, at a head of a runway in preparation for a landing routine in Block S120; and, in response to the aircraft reaching a trigger waypoint, in the sequence of aircraft waypoints, preceding the runway, triggering the tram 100 to accelerate to a landing speed of the aircraft in Block S122. The landing routine can also include, at the tram 100: adjusting output power of a drivetrain in the tram 100 to sequentially arrive at each tram waypoint in the sequence of tram waypoints concurrent with arrival of the aircraft at corresponding aircraft waypoints in the sequence of aircraft waypoints in Block S130; recording a sequence of optical images through an optical sensor 150 arranged on the tram 100 in Block S140; detecting an optical fiducial arranged on the aircraft in the sequence of optical images in Block S142; calculating offset distances from a latch 130 on the tram 100 to a latch receiver on the aircraft based on the optical fiducial detected in the sequence of optical images in Block S144; in response to an offset distance from the latch 130 to the latch receiver falling below a threshold distance, transitioning from adjusting power output of the drivetrain 120 in Block S150 to sequentially arrive at tram waypoints in the predefined sequence of tram waypoints concurrent with arrival of the aircraft at corresponding aircraft waypoints in the predefined sequence of aircraft waypoints to adjusting output power of the drivetrain 120 and adjusting a position of the latch 130 on the tram 100 based on positions of the optical fiducial detected in optical images recorded by the optical sensor 150; in response to contact between the latch 130 and the latch receiver, triggering the latch 130 to engage the latch receiver in Block S160; and, in response to the latch 130 engaging the latch receiver, decelerating the aircraft in Block S170.

8.1 Waypoints

In Block S110, the remote computer system can assign a known airport to an aircraft, assign a known runway at the airport to the aircraft, and queue a landing routine for the aircraft at the runway. The remote computer system can then generate a sequence of aircraft waypoints defining a target approach of the aircraft toward the runway to initiate the landing routine. For example, the remote computer system can access a generic predefined approach path, access a predefined approach path specific to a type of the aircraft, calculate a custom approach path for the aircraft, such as based on a type, weight, stall speed, lift coefficient, etc. of the aircraft and based on local wind and weather conditions near the runway. The predefined approach path can specify a sequence of aircraft freedom waypoints for landing at the assigned runway, wherein each waypoint specifies target geospatial latitude, geospatial longitude, altitude, pitch, yaw, and roll values and a target speed for the aircraft. In this example, the waypoints can be linearly offset, such as by ten meters along the predefined approach path linear or offset by a distance proportional to a distance from the aircraft to the tram 100. The remote computer system can upload these aircraft waypoints to the aircraft in Block Silo, such as prior to takeoff or once the runway and approach path are assigned to the aircraft, as shown in FIG. 4.

In Block S112, the remote computer system can similarly access a predefined tram path or calculate a custom tram path for the tram 100 based on the approach path selected or calculated for the aircraft in Block Silo. The predefined tram path can specify a sequence of tram waypoints, wherein each tram waypoint specifies: global target geospatial latitude and longitude values for the tram 100; a global target speed for the tram 100; and local altitude, pitch, yaw, and/or roll values for the dock on the tram 100. Each tram waypoint in the sequence of tram waypoints can be linked (i.e., mapped) to and executed synchronously with one aircraft waypoint in the sequence of aircraft waypoints. In particular, the remote computer system can interface with both the aircraft and the tram 100 to achieve synchronicity between the aircraft and the tram 100 such that the tram 100 reaches a first tram waypoint in the sequence of tram waypoints when the aircraft reaches a corresponding aircraft waypoint in the sequence of aircraft waypoints, as described below. The remote computer system can upload these tram waypoints to the tram 100 in Block S112, such as once the tram 100 is queued to receive the aircraft at the assigned runway, as shown in FIG. 4.

8.2 Approach

In preparation for the landing cycle, the remote computer system can send a prompt to the tram 100 to navigate to the first tram waypoint—in the sequence of tram waypoints—at the head of the runway in Block S120; the tram 100 can then implement autonomous ground-based navigation techniques to navigate to the first waypoint.

To begin the landing routine, the aircraft can navigate to an initial aircraft waypoint (e.g., one mile ahead of the runway) and then implement autonomous flight control methods (e.g., autopilot techniques) to navigate through the remaining sequence of waypoints. For example, as the aircraft approaches the runway, an autopilot system in the aircraft can: track the 3D geospatial location (e.g., latitude, longitude, and altitude), 3D orientation (e.g., pitch, yaw, and roll), and speed, etc. of the aircraft through a geospatial location sensor integrated into the aircraft, such as relative to fixed ground-based geospatial location sensors; calculate differences between the actual 3D geospatial location, actual 3D orientation, and actual speed of the aircraft and corresponding target values specified in the aircraft waypoints; and implement closed-loop controls to adjust various flight surfaces and engine power to reduce these differences upon arrival at a next aircraft waypoint.

8.3 Tram Trigger

In Block S122, the remote computer system triggers the tram 100 to execute the sequence of tram waypoints in response to detecting arrival of the aircraft at a trigger waypoint preceding the runway, as shown in FIG. 4. In particular, the remote computer system can trigger the tram 100 to rapidly accelerate to a landing speed of the aircraft and to reach this landing speed—matched to the speed of the aircraft—at approximately the same time that the aircraft reaches an altitude at which the alignment receiver on the aircraft is accessible to (e.g., within a minimal distance from) the alignment feature 132 in order to limit a length of the runway traversed by the tram 100 before engagement with the aircraft during the landing routine.

For example, the remote computer system can define an aircraft trigger waypoint 2,400 feet ahead of the first tram waypoint and then trigger the tram 100 to execute the sequence of tram waypoints once the aircraft reaches the trigger aircraft waypoint. In particular, in this example, the remote computer system can trigger the tram 100 to execute the sequence of tram waypoints when the aircraft reaches a distance from the stopped tram equivalent to an approximate distance covered by the aircraft traveling at a speed specified in subsequent aircraft waypoints (e.g., ~170 to ~157 mph) over a period of time needed by the tram 100 to accelerate to the landing speed (e.g., 7.8 seconds) summed with the distance covered by the tram 100 accelerating to the landing speed in this period of time.

(Alternatively, the foregoing methods and techniques can be executed locally by a local controller 160 within the tram 100, a local controller in the aircraft, or by a controller distributed between the tram 100 and the aircraft. For example, the tram 100 can establish a wireless local or network connection with aircraft and the aircraft approaches the runway, the tram 100 and aircraft can share geospatial and motion data over this wireless connection directly throughout the landing routine, and the controller 160 can execute Block S122 locally.)

Once triggered by the remote computer system, the controller 160 can implement autonomous navigating techniques and closed-loop controls to modulate power supplied to motors (or other actuators) in the drivetrain 120 to execute the sequence of tram waypoints in Block S130. In particular, the controller 160 can: receive a sequence of confirmations of arrival of the aircraft at its assigned aircraft waypoints via the wireless communication module 152 described above; and then implement closed-loop controls to adjust speed of the drivetrain 120 to sequentially arrive at each tram waypoint—in the predefined sequence of tram waypoints—along the runway concurrent with receipt of confirmations of arrival of the aircraft at corresponding aircraft waypoints in the predefined sequence of aircraft waypoints.

8.4 Local Optical Location

As described above, the controller 160 in the tram 100 can record optical images of a sky region above the tram 100 through one or more optical sensors, such as from initiation of the landing routine, from initial motion of the tram 100 from the first waypoint, or once the tram 100 reaches a trigger tram waypoint corresponding to a predicted distance from the aircraft to the tram 100 for which an optical fiducial on the aircraft is reliably detectable in the fields of view of the optical sensors. The controller 160 can then implement methods and techniques described above to locally process these optical images to determine a real 3D position and 3D orientation (e.g., x, y, and z offset and pitch, yaw, and roll angles) of the aircraft relative to the tram, as shown in FIG. 4.

For example, the controller 160 can implement methods and techniques described above to transform optical images recorded by the optical sensors into lateral, longitudinal, and vertical offset distances and pitch, yaw, and roll offset angles between an alignment receiver on the aircraft and a corresponding alignment feature 132 on the tram 100. In this example, the controller 160 can implement a known pattern of optical fiducials on the aircraft and known distances between these optical fiducials: to determine a relative pitch angle of the aircraft based on a fore-aft skew of optical fiducials detected in optical images; to determine a relative roll angle of the aircraft based on left-right skew of optical fiducials detected in optical images; to determine a vertical distance between the aircraft and the tram 100 based on proximity of optical fiducials detected in optical images; to determine relative yaw angle of the aircraft based on angular alignment of the pattern of optical fiducials detected in optical images to the anteroposterior axis of the tram 100; to determine relative lateral offset of the aircraft based on linear alignment of the pattern of optical fiducials detected in optical images to the anteroposterior axis of the tram 100; and to determine a relative longitudinal offset of the aircraft based on linear alignment of the pattern of optical fiducials detected in optical images to the lateral axis of the tram 100.

Once the controller 160 determines that an offset distance (e.g., a vertical distance or nearest distance) from the latch 130 to the latch receiver (or from the alignment feature 132 to the alignment receiver) is less than a threshold distance, such as based on an offset distance extracted from optical images and/or based on waypoints last occupied by the aircraft and the tram 100, the controller 160 can transition to controlling the speed of the tram 100 and the position of the motion platform 134 based on a relative position and orientation of the aircraft extracted from optical data recorded through optical sensors in the tram 100.

In one variation, the tram 100 can additionally or alternatively include similar optical fiducials, such as patterned across length and width of its top or patterned directly over the aircraft dock; and the aircraft can similarly include an optical sensor facing downwardly from its fuselage and a local controller that implements similar methods and techniques to locate the tram 100 relative to the aircraft. In this variation, the local controller in the aircraft can interface with the controller 160 in the tram 100 via a local wireless connection to confirm—substantially in real-time—positions and orientations of the aircraft relative to the tram 100 calculated by the controller 160 in the tram 100. The controller 160 can then merge, average, or otherwise combine position and orientation data generated locally on the tram 100 and remotely on the aircraft to calculate a next speed of the tram 100 and a next position of the motion platform 134 as the aircraft descends further toward the tram 100.

8.5 Engagement

The tram 100 can also include sensors in the alignment features to determine when the alignment features have fully engaged their corresponding alignment receivers in the aircraft; the aircraft can similarly include sensors in its alignment receivers to determine when the alignment receivers in the aircraft have fully received their corresponding alignment features on the tram 100. Once the controller 160 detects engagement between the alignment features and their alignment receivers—and once the controller 160 receives confirmation of this engagement from the aircraft—the controller 160 can trigger the latch 130 to engage the latch receiver on the aircraft in Block S160, as shown in FIG. 4.

Once the latch 130 has engaged the latch receiver, the controller 160 can: trigger the telescoping boom 136 to retract; trigger the cradle points 142 to extend out to meet corresponding hard points in the aircraft; and then trigger the drivetrain 120 to (rapidly) decelerate the tram 100 and the aircraft in Block S170. For example, for the aircraft that includes reverse thrusters, the controller 160 in the aircraft can coordinate with the aircraft (e.g., directly over a wired or wireless connection) to simultaneously trigger the drivetrain 120 to enter a braking mode and to actuate the reverse thrusters in the aircraft. Alternatively, the controller 160 can trigger the aircraft to cut its engines once the latch 130 has engaged the latch receiver in preparation for the drivetrain 120 decelerating the tram 100 and the aircraft.

However, the tram 100 can cooperate with the aircraft and the remote computer system in any other way to execute a landing process.

9. Taxiing Process

Once the tram 100 has decelerated the aircraft to a taxiing speed, such as independently or in cooperation with the aircraft, the tram 100 can implement autonomous ground-based navigating techniques to deliver the aircraft to a gate assigned to the aircraft, such as by the remote computer system. For example, the tram 100 can navigate along a predefined route from the terminus of the runway to the assigned gate.

Once the aircraft is unloaded, reloaded, and refueled at the gate and then queued by the remote computer system for takeoff from an assigned runway, the remote computer system can serve a prompt to the tram 100 to return to the landing end of the assigned runway in Block S180; and the tram 100 can then autonomously navigate to the assigned runway, such as along a predefined route from the gate to the head of the runway in preparation for a next takeoff cycle in Block S182, as shown in FIG. 5. For example, the tram 100 can include a suite of laser or other optical based sensors and can implement autonomous navigation techniques to autonomously navigate along taxi routes and to avoid collisions with other trams and aircraft on the tarmac based on outputs of these sensors.

10. Takeoff Routine

In one variation shown in FIG. 5, the tram 100 interfaces with the remote computer system and the aircraft to execute a takeoff routine. In this variation, once the tram 100 arrives at the head of the runway and the remote computer system clears the aircraft for takeoff, the remote computer system serves confirmation for a takeoff routine to the aircraft and to the tram 100 in Block S190. The tram 100 can then query the aircraft for confirmation of a system check, such as via a wired or local wireless connection, as described above, in Block S192. In response to receipt of such confirmation (and following its own internal systems check), the tram 100 can: assume a master control; issue a prompt to the aircraft to set its engines at maximum speed in Block S194; and substantially simultaneously trigger the drivetrain 120 to accelerate down the runway to a takeoff speed in Block S196.

Alternatively, the aircraft can assume master control and issue commands to the tram 100 to accelerate down the runway. For example, the remote computer system can transmit confirmation for the takeoff routine to the tram 100 and to the aircraft to arm the tram 100 and the aircraft for autonomous takeoff. Once it has autonomously completed a final systems check, the aircraft can transmit a takeoff trigger to the tram 100 and set its engines to full power. Upon receipt of the takeoff trigger from the aircraft, the controller 160 can set the drivetrain 120 to full (or increased) power to cooperate with the aircraft to accelerate to a takeoff speed, such as a generic takeoff speed specified for a type of the aircraft or calculated based on a laden weight of the aircraft measured by the tram 100, as described above.

While accelerating, the tram 100 can also cooperate with the aircraft to remain centered on the runway, such as by executing a sequence of takeoff waypoints centered along the runway or by following a lane marker along the runway.

Once the aircraft reaches the takeoff speed, the controller 160 can trigger the latch 130 to release the latch receiver and trigger the telescoping boom 136 and cradle points 142 to retract into the chassis 100 in Block S198, such as to reduce risk of damage to the fuselage of the aircraft. Alternatively, as the tram 100 and aircraft accelerate, the controller 160 can additionally or alternatively sample a strain gauge or tension sensor in the latch 130, motion platform 134, or telescoping boom 136, etc. to determine a level of lift induced by the aircraft's wings as the aircraft accelerates. Once the level of lift created by the aircraft exceeds a preset threshold, the controller 160 can trigger the latch 130 to release, etc. Yet alternatively, the controller 160 can delay release of the latch 130, etc. until both the takeoff speed is reached and lift created by the aircraft exceeds the preset threshold.

Once the latch 130 is released in Block S198 and as the aircraft begins to separate from the tram 100, the controller 160 can continue to monitor distances from the aircraft to the tram 100 based on optical fiducials—on the aircraft—detected in optical images recorded by the optical sensor 150 in the tram 100 during the takeoff routine. (The controller 160 can additionally or alternatively monitor distances from the aircraft to the tram 100 based on geospatial locations recorded by geospatial location sensors in the tram 100 and the aircraft.) Once the distance between the aircraft and the tram 100 exceeds a preset threshold (e.g., once the aircraft has ascended sufficiently above the tram 100, such as two meters), the controller 160 can trigger the drivetrain 120 to rapidly decelerate the tram 100 before reaching the terminus of the runway.

The controller 160 can then navigate the tram 100 to a holding area or return directly to the head of the runway in preparation to execute a next landing routine with another aircraft according to methods and techniques described above.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A tram system comprising:
   a chassis;
   a latch coupled to the chassis and configured to selectively engage a latch receiver mounted to an underside of a fuselage of an aircraft;
   an alignment feature:
      adjacent the latch;
      configured to selectively engage an alignment receiver mounted to the underside of the fuselage of the aircraft; and
      configured to communicate forces parallel to an anteroposterior axis of the chassis into the aircraft;
   a first optical sensor facing upwardly from the chassis and configured to record a first sequence of optical images;
   a drivetrain configured to accelerate and decelerate the chassis along a runway;
   a controller configured, during a landing routine:
      to detect a first optical fiducial arranged on the aircraft in the first sequence of optical images recorded by the first optical sensor;
      to adjust a speed of the drivetrain to longitudinally align the first alignment feature with the first alignment receiver on the aircraft during descent of the aircraft toward the runway based on positions of the first optical fiducial detected in the first sequence of optical images;
      to trigger the latch to engage the latch receiver on the aircraft in response to descent of the first alignment receiver onto the first alignment feature; and
      to trigger the drivetrain to actively decelerate the chassis and the aircraft in response to engagement of the latch on the latch receiver.

2. The system of claim 1:
   further comprising a communication module configured to communicate with the aircraft;
   wherein the controller is further configured to control the drivetrain to navigate the chassis to a head of the runway during a taxiing routine; and
   wherein the controller is further configured, during a takeoff routine:
      to receive takeoff confirmation from the aircraft via the communication module;
      to trigger the drivetrain to accelerate down the runway concurrently with acceleration of engines in the aircraft in response to receipt of takeoff confirmation from the aircraft; and
      to trigger the latch to release the latch receiver on the aircraft in response to a velocity of the chassis exceeding a takeoff speed assigned to the aircraft.

3. The system of claim 1:
   further comprising a rail follower extending from the chassis, configured to engage a power rail integrated into the runway, and configured to source electrical power from the power rail; and
   wherein the drivetrain:
      comprises a set of electric motors configured to drive a set of wheels to accelerate the chassis;
      configured to source power from the power rail via the rail follower to power the set of electric motors; and
      operable in a generator mode to feed energy back into the power rail via the rail follower to actively decelerate the chassis and the aircraft in response to engagement of the latch on the latch receiver during the landing routine.

4. The system of claim 3:
   further comprising a power coupling adjacent the latch and configured to engage a power receptacle on the underside of the fuselage of the aircraft;
   wherein the controller is configured to trigger the rail follower to retract from the power rail in response to conclusion of the landing routine; and
   wherein the drivetrain is configured to source power from the aircraft via the power coupling, during navigation from the terminus of the runway to a gate in an airport assigned to the aircraft, following retraction of the rail follower from the power rail.

5. The system of claim 1:
   further comprising a rail follower:
      extending from the chassis;
      configured to engage a power rail integrated into the runway; and
      comprising an electromagnetic element configured to face the power rail; and
   wherein the drivetrain comprises a set of electric motors:
      configured to drive a set of wheels under the chassis;
      operable in a motor mode to source power from the power rail via the rail follower to accelerate the chassis prior to engagement of the latch during the landing routine; and
      operable in a generator mode to feed energy to the electromagnetic element on the rail follower to induce Eddy currents in the power rail to slow the chassis and the aircraft following engagement of the latch during the landing routine.

6. The system of claim 1:
   further comprising a rail follower:
      extending from the chassis;
      configured to engage an undercut linear rail extending longitudinally along the runway; and
      configured to communicate lateral forces into the rail to maintain a lateral position of the chassis along the runway during the landing routine;
   further comprising a lateral adjustment subsystem coupling the latch and the first alignment feature to the chassis; and
   wherein the controller is configured to adjust a position of the lateral adjustment subsystem to align the first alignment feature to the first alignment receiver on the aircraft by maintaining the first optical fiducial proximal a first target position in the first sequence of optical images as the aircraft approaches the runway during the landing routine.

7. The system of claim 1:
   further comprising a wireless communication module coupled to the controller;
   further comprising a geospatial location sensor coupled to the controller and configured to interface with a remote computer network to calculate a geospatial location of the chassis;

wherein the controller:
  interfaces with the drivetrain to navigate the chassis at a first tram waypoint defining a first geospatial location proximal a head of the runway in preparation for the landing routine; and
  triggers the drivetrain to accelerate the chassis down the runway in response to a receipt of confirmation of arrival of the aircraft at a first aircraft waypoint ahead of the runway via the wireless communication module.

8. The system of claim 7:
wherein the wireless communication module receives a sequence of confirmations of arrival of the aircraft at a predefined sequence of aircraft waypoints; and
wherein the controller implements closed-loop controls to adjust speed of the drivetrain to sequentially arrive at each tram waypoint in a predefined sequence of tram waypoints along the runway concurrent with receipt of confirmations of arrival of the aircraft at corresponding aircraft waypoints in the predefined sequence of aircraft waypoints.

9. The system of claim 8, wherein the controller:
calculates offset distances from the first alignment feature to the first alignment receiver on the aircraft based on distances between the first optical fiducial and a second optical fiducial detected in the first sequence of optical images; and
in response to an offset distance from the first alignment feature to the first alignment receiver on the aircraft falling below a threshold distance, transitions from implementing closed-loop controls to adjust speed of the drivetrain to sequentially arrive at tram waypoints in the predefined sequence of tram waypoints concurrent with receipt of confirmations of arrival of the aircraft at corresponding aircraft waypoints in the predefined sequence of aircraft waypoints to implementing closed-loop controls to adjust speed of the drivetrain and a position of the first alignment feature relative to the chassis based on positions of the first optical fiducial detected in optical images recorded by the first optical sensor.

10. The system of claim 1:
further comprising
  a telescoping boom coupling the latch and the first alignment feature to the chassis configured to raise the latch and the first alignment feature above the chassis to meet the aircraft during the landing routine; and
  a cradle comprising a set of cradle points configured to contact and support corresponding hard points defined across the underside of the fuselage and wings of the aircraft; and
wherein the controller:
  extends the telescoping boom upward to mate the first alignment feature to the first alignment receiver on the aircraft during descent of the aircraft; and
  retracts the telescoping boom to draw the aircraft into the cradle and to mate the set of cradle points in the cradle to hard points defined across the aircraft in response to engagement of the latch with the latch receiver.

11. The system of claim 10:
wherein each cradle point, in the set of cradle points, is mounted to a retractable pin in a set of retractable pins coupled to the chassis;
wherein the set of retractable pins is arranged on the chassis in an array corresponding to a generic arrangement of hard points on the aircraft;
wherein the controller is configured, during the landing routine:
  to access a database of vertical positions of hard points arranged across the aircraft; and
  to extend the set of retractable pins according to the database of vertical positions in order to engage each cradle point, in the set of cradle points, to corresponding hard points on the aircraft.

12. The system of claim 10, wherein the controller is further configured, during a takeoff routine:
  to unlock the telescoping boom to permit the aircraft to ascend off of the cradle;
  to trigger the latch to release the latch receiver in response to extension of the telescoping boom to a threshold height above the chassis; and
  to maintain forward acceleration of the chassis via the drivetrain to communicate forward force into the aircraft via the telescoping boom and the first alignment feature following release of the latch from the latch receiver.

13. The system of claim 1:
wherein the first alignment feature defines an external frustoconical section configured to mate with the first alignment receiver defining an internal frustoconical section in the aircraft;
wherein the latch comprises:
  a set of bearings arranged in captured bores in the first alignment feature; and
  an expansion driver:
    running inside the first alignment feature;
    operable in an advanced position to expand the set of ball bearings outwardly into engagement with a shoulder defining the first latch receiver inside the first alignment receiver; and
    operable in a retracted position to release the ball bearings from the shoulder; and
wherein the controller is configured:
  to trigger the expansion driver to transition into the advanced position to lock the set of ball bearings to the shoulder in response to descent of the first alignment receiver onto the first alignment feature during the landing routine; and
  to trigger the expansion driver to transition into the retracted position to unlock the set of ball bearings from the shoulder in response to acceleration of the chassis and the aircraft to a takeoff speed assigned to the aircraft during a takeoff routine succeeding the landing routine.

14. The system of claim 1:
further comprising a motion platform supporting the first alignment feature on the chassis;
wherein the first optical sensor is arranged on the motion platform adjacent the first alignment feature;
further comprising:
  a second alignment feature arranged on the motion platform and offset from the first alignment feature;
  a third alignment feature arranged on the motion platform and offset from the first alignment feature and the second alignment feature;
  a second optical sensor arranged on the motion platform adjacent the second alignment feature;
  a third optical sensor arranged on the motion platform adjacent the third alignment feature;

wherein the controller adjusts a speed controller and a braking system in the drivetrain and adjusts a position of the motion platform relative to the chassis to:
maintain the first optical fiducial proximal a first target position in a first field of view of the first optical sensor,
maintain a second optical fiducial proximal a second target position in a second field of view of the second optical sensor, and
maintain a third optical fiducial proximal a third target position in a third field of view of the third optical sensor from a time that the aircraft is within a threshold distance of the chassis until the first alignment feature engages the first alignment receiver in the aircraft, the second alignment feature engages a second alignment receiver in the aircraft, and the third alignment feature engages a third alignment receiver in the aircraft.

15. The system of claim 14:
wherein the first optical sensor is configured to detect infrared light at a first wavelength broadcast by the first optical fiducial on the aircraft;
wherein the second optical sensor is configured to detect infrared light at a second wavelength broadcast by the second optical fiducial on the aircraft, the second wavelength different from the first wavelength;
wherein the third optical sensor is configured to detect infrared light at a third wavelength broadcast by the third optical fiducial on the aircraft, the third wavelength different from the first wavelength and the second wavelength;
wherein the motion platform comprises a gimbal; and
wherein the controller, during the landing routine:
calculates a pitch angle offset, a yaw angle offset, and a roll angle offset of the aircraft relative to the gimbal based on a first position of infrared light detected in a first optical image in the first sequence of optical images, a second position of infrared light detected in a second optical image in a second sequence of optical images recorded by the second optical sensor, and a third position of infrared light detected in a third optical image in a third sequence of optical images recorded by the third optical sensor; and
implements closed-loop controls to adjust a pitch angle, a yaw angle, and a roll angle of the gimbal to reduce the pitch angle offset, the yaw angle offset, and the roll angle offset of the aircraft.

16. The system of claim 1:
further comprising a front gimbal arranged proximal a front of the chassis;
further comprising a rear gimbal arranged proximal a rear of the chassis;
wherein the latch is arranged on the front gimbal and is configured to selectively engage a latch receiver arranged proximal a front of the fuselage of the aircraft;
wherein the first alignment feature is arranged on the front gimbal adjacent the latch and is configured to selectively engage the first alignment receiver arranged proximal the front of the fuselage of the aircraft;
further comprising a second latch arranged on the rear gimbal and is configured to selectively engage a rear latch receiver arranged proximal a rear of the fuselage of the aircraft;
further comprising a rear alignment feature:
arranged on the rear gimbal adjacent the rear latch;
configured to selectively engage a rear alignment receiver arranged proximal the rear of the fuselage of the aircraft; and
configured to cooperate with the first alignment feature to communicate forces parallel to the anteroposterior axis of the chassis into the aircraft; and
wherein the controller is configured, during the landing routine:
to independently adjust lateral positions of the front gimbal and the rear gimbal to accommodate a yaw angle of the aircraft in the presence of a headwind during approach of the aircraft toward the runway by aligning the first alignment feature with the first alignment receiver on the aircraft and aligning the rear alignment feature with the rear alignment receiver on the aircraft.

17. The system of claim 16, wherein the controller is configured to release locks on the front gimbal and the rear gimbal to accommodate a change in yaw angle of the aircraft in the presence of a headwind acceleration of the aircraft to takeoff speed during a takeoff routine.

18. A method comprising:
assigning a sequence of aircraft waypoints along a landing approach path and along a runway at an airport to an aircraft;
assigning a sequence of tram waypoints along the runway to a tram;
prompting the tram to navigate to a first tram waypoint, in the sequence of tram waypoints, at a head of a runway in preparation for a landing routine;
in response to the aircraft reaching a trigger waypoint, in the sequence of aircraft waypoints, preceding the runway, triggering the tram to accelerate to a landing speed of the aircraft;
at the tram:
adjusting output power of a drivetrain in the tram to sequentially arrive at each tram waypoint in the sequence of tram waypoints concurrent with arrival of the aircraft at corresponding aircraft waypoints in the sequence of aircraft waypoints;
recording a sequence of optical images through an optical sensor arranged on the tram;
detecting an optical fiducial arranged on the aircraft in the sequence of optical images;
calculating offset distances from a latch on the tram to a latch receiver on the aircraft based on the optical fiducial detected in the sequence of optical images;
in response to an offset distance from the latch to the latch receiver falling below a threshold distance, transitioning from adjusting power output of the drivetrain to sequentially arrive at tram waypoints in the predefined sequence of tram waypoints concurrent with arrival of the aircraft at corresponding aircraft waypoints in the predefined sequence of aircraft waypoints to adjusting output power of the drivetrain and adjusting a position of the latch on the tram based on positions of the optical fiducial detected in optical images recorded by the optical sensor;
in response to contact between the latch and the latch receiver, triggering the latch to engage the latch receiver; and
in response to the latch engaging the latch receiver, decelerating the aircraft.

19. The method of claim 18:
wherein decelerating the aircraft comprises decelerating the aircraft to a taxiing speed; and
further comprising:
  assigning a gate of the airport to the tram;
  at the tram, autonomously navigating, with the aircraft in tow, to the gate in response to decelerating the aircraft to the taxiing speed.

20. The method of claim 19, further comprising:
prompting the tram to autonomously navigate, with the aircraft in tow, from the gate to the head of the runway in preparation for a takeoff routine;
transmitting confirmation for the takeoff routine to the aircraft and to the tram;
at the tram:
  in response to receiving confirmation for the takeoff routine and receiving system confirmation from the aircraft, accelerating down the runway to a takeoff speed of the aircraft;
  in response to reaching the takeoff speed, releasing the latch from the latch receiver to release the aircraft from the tram;
  decelerating in response to an offset distance between the latch and the latch receiver exceeding a takeoff threshold distance.

* * * * *